June 13, 1939.　　　P. M. STEPHENS　　　2,162,650
WEIGHT BEARING HINGE
Filed July 25, 1938
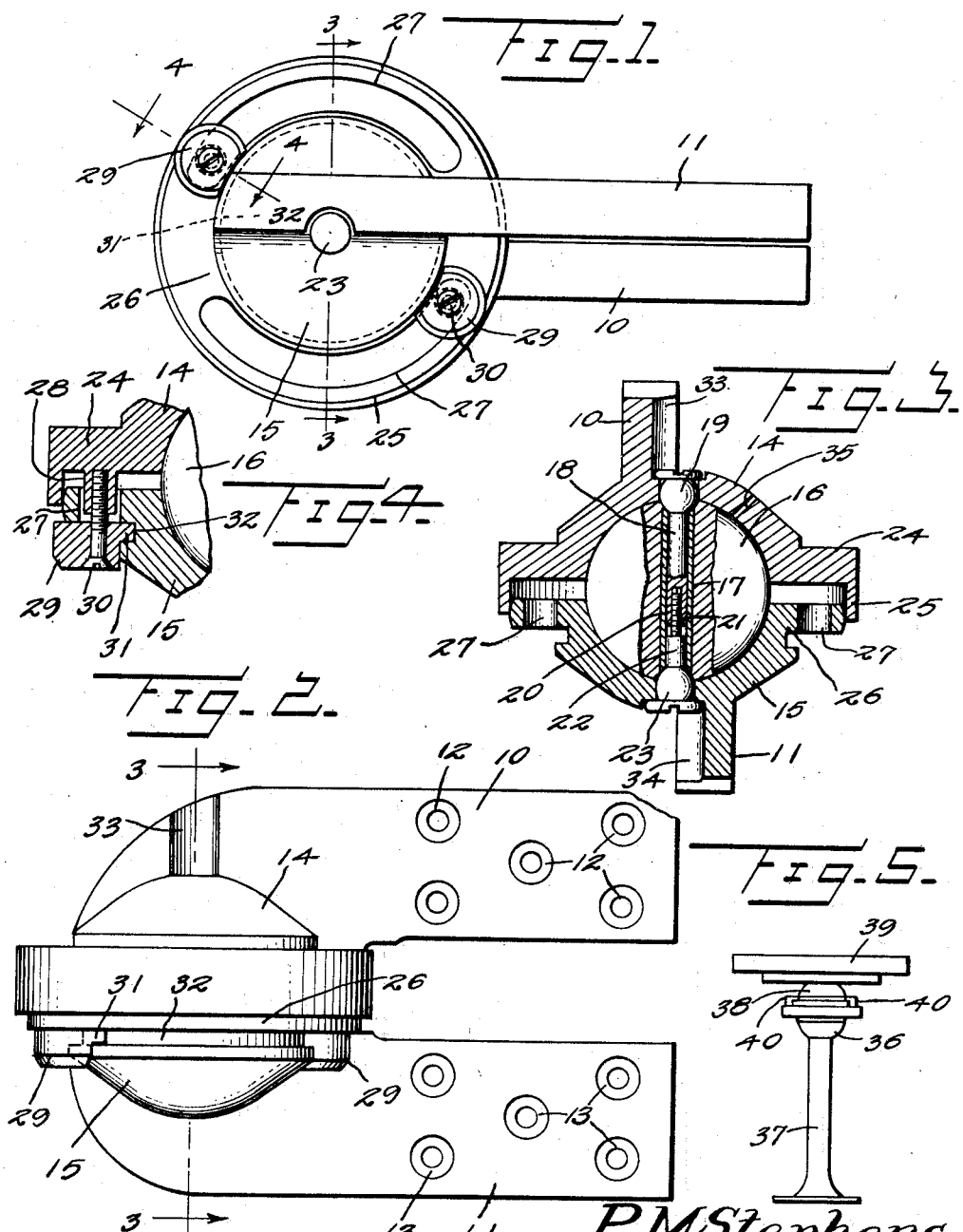

Patented June 13, 1939

2,162,650

UNITED STATES PATENT OFFICE 2,162,650

WEIGHT BEARING HINGE

Paul M. Stephens, Columbia, Mo.

Application July 25, 1938, Serial No. 221,184

2 Claims. (Cl. 16—191)

This invention relates to weight bearing hinges and has for an object to provide a leaf hinge having a ball and socket joint so constructed that the weight of the hinged article will be supported upon the ball.

A further object is to provide a leaf hinge having a ball and socket joint provided with novel guide pins carrying half moon shaped guides for stabilizing the joint.

A further object is to provide a device of this character for general use and which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a bottom plan view of a weight bearing hinge constructed in accordance with the invention.

Figure 2 is a side elevation of the hinge shown in Figure 1.

Figure 3 is a cross sectional view taken on the line 3—3 of Figure 1.

Figure 4 is a detail sectional view taken on the line 4—4 of Figure 1.

Figure 5 is a side elevation of a modified form of the invention showing the ball and socket joint used in connection with a counter stool.

Referring now to the drawing in which like characters of reference designate similar parts in the various views, a weight bearing hinge is shown, comprising leaves 10 and 11 having openings 12 and 13 respectively through which securing devices may be passed to mount the hinge upon any swinging part. The leaf 10 is provided with a hemispherical shell 14 and the leaf 11 is provided with a hemispherical shell 15, these shells coacting in forming a ball socket to receive a steel ball 16 best shown in Figure 3.

The ball is provided with an axial bushing 17 which receives a pivot pin comprising a pin 18 having a head 19 at one end countersunk in the shell 14 and having a threaded counterbore 20 which receives the threaded reduced end 21 of a pin 22 having a head 23 countersunk in the shell 15.

The shell 14 is provided with a circumferential flange 24 having a depending ring 25 at the peripheral edge. The shell 15 is provided with a flange 26 which is telescopically received within the ring 25, as best shown in Figure 3, and is spaced from the flange 24 of the shell 14 by the ball 16 so that the latter carries the weight of any swinging part to which the hinge is secured.

The flange 26 of the shell 15 is provided with a pair of arcuate slots 27, best shown in Figure 1, which receive tubular studs 28, best shown in Figure 4, these studs being formed integral with the flange 24 of the shell 14.

Half moon shaped guides 29 are secured to the underneath face of the flange 26 through the medium of screws 30 passed upwardly through the guides and into the tubular studs 28. Each guide is provided with a lip 31 which projects into a groove 32 formed in the shell 15 as best shown in Figures 2 and 4.

The slots 27 are arranged at diametrically opposite points on the flange 26 of the shell 15 and are concentric with the pivot pin and bushing of the ball. These slots are of equal length and the tubular studs 28 are so disposed that the half moon guides 29 will be always positioned diametrically opposite each other, one being at the outer end of its slot and the other being at the inner end of its slot when the leaves 10 and 11 are closed together and vice versa when the leaves are opened.

The leaves 10 and 11 are provided with vertically disposed grooves 33 and 34 which permit application and removal of the pins 18 and 22 from the bushing 17. An opening 35 is formed in the shell 14 through which the bearing ball 16 may be oiled.

In operation the half moon guides 29 stabilize action of the hinge and also through the instrumentality of the lips 31 coact in holding the flanges 24 and 26 of the socket member spaced apart so that the weight of the swinging part hinged by the hinge is borne by the ball 16.

In practice the hinge may be made in both right and left hand types.

In Figure 5 there is shown a modified form of the device in which the lower socket member 36 is provided with an integral pedestal 37 and the upper socket member 38 is provided with an integral seat 39. Limited rotation of the upper socket member relatively to the lower socket member on the ball is controlled through the medium of the half moon guides 40 carried by guide pins working in slots as previously described.

A ball and socket joint as above described is adapted for use in connection with platforms, counter stools, chairs, and similar devices which are controlled to a limited arc of revolution in either direction.

It will be pointed out that the pivot pin comprising the pins 18 and 22 having the respective ball heads 19 and 23 hold the upper shell 14 at pivot balance at all times and the ball heads on the pivot pins cause the same ball action effect as if only the solid ball were used since the ball heads fit in cup shaped seats provided at the top and bottom of the ball allowing the ball pin heads to turn on the cup shaped seats with the same speed, as the ball. Furthermore the bushing 17 and the ball 16 are always free acting which eliminates binding.

From the above description it is thought that the construction and operation of the invention will be fully understood without further explanation.

What is claimed is:

1. A weight bearing hinge comprising leaves, shells on the leaves coacting in forming a socket, flanges on the shells, a weight bearing ball in the socket spacing the flanges apart, a sectional pivot pin disposed axially in the ball having ball heads fitting in cup shaped seats in the ball, and means carried by the flanges for limiting relative movement of the shells on the ball.

2. A weight bearing hinge comprising leaves, shells on the leaves coacting in forming a socket, flanges on the shells, a weight bearing ball in the socket spacing the flanges apart, a bushing loose in the ball, a pivot pin disposed in the shells having ball heads fitting in cup shaped seats in the ball, and flat outer heads containing notches to accommodate a screw driver, said bushing turning freely as a unit relatively to the ball and preventing binding, and means carried by the flanges for limiting relative movement of the shells on the ball.

PAUL M. STEPHENS.